United States Patent [19]

Schmerler et al.

[11] Patent Number: 5,164,764
[45] Date of Patent: Nov. 17, 1992

[54] APPARATUS FOR DETERMINING A COLOR FILTER VALUE FOR THE EXPOSURE OF A GRADATION CHANGE PAPER

[75] Inventors: Detlev Schmerler, Furstentum, Liechtenstein; Gerhard Brugger, Rottach-Egern, Fed. Rep. of Germany

[73] Assignee: bbs AG International, Fed. Rep. of Germany

[21] Appl. No.: 746,429

[22] Filed: Aug. 16, 1991

[30] Foreign Application Priority Data

Dec. 22, 1989 [DE] Fed. Rep. of Germany ....... 3942635
Nov. 8, 1990 [WO] PCT Int'l Appl. ... PCT/DE90/00847

[51] Int. Cl.$^5$ .......................................... G03B 27/80
[52] U.S. Cl. .......................................... 355/38; 355/77
[58] Field of Search ....................... 355/38, 68, 71, 77; 358/76, 80

[56] References Cited

U.S. PATENT DOCUMENTS 3,800,070  3/1974  Barbieri ................. 355/35
4,885,607  12/1989  Farb ..................... 355/77

FOREIGN PATENT DOCUMENTS 1539468  1/1979  United Kingdom .

Primary Examiner—Michael L. Gellner
Assistant Examiner—D. Rutledge
Attorney, Agent, or Firm—Harry M. Weiss

[57] ABSTRACT

An apparatus for determining a color filter value, which is to be used for a specific original for exposing a gradation change paper, comprises a recording device (16), an inverting circuit (17) and a monitor (18), which operates in a black-and-white mode of operation, as well as an electronic contrast control device used for said monitor (18) and calibrated such that each adjustment value of the electronic contrast control device has associated therewith a color filter value which relates to a color filter (8, 29) to be used upon exposing the gradation change paper and on the basis of which a contrast of the print corresponding to that of the image on the monitor will be achieved.

10 Claims, 2 Drawing Sheets

APPARATUS FOR DETERMINING A COLOR FILTER VALUE FOR THE EXPOSURE OF A GRADATION CHANGE PAPER

BACKGROUND OF THE INVENTION

The present invention refers to an apparatus for determining a colour filter value, which is to be used for a specific original for exposing a gradation change paper.

In the production of black-and-white positive prints from negatives showing excessively strong or insufficient contrasts, which are also referred to as too hard or too soft negatives, photographic papers with different gradations, i.e. so called soft and hard photographic papers, are used for correcting these contrast ranges deviating from the desired contrast ranges. It follows that for compensating an excessively hard negative, a so called soft photographic paper will be used, and vice versa. For some time, so called gradation change papers, which are also referred to as multigrade papers, have been used for adjusting the desired contrast in the case of the positive print, the gradation or contrast property of said gradation change papers depending on the wavelength of the exposure light used. Hence, the gradation of such a gradation change paper can be adjusted freely by using various preceding colour filter combinations upon exposing the positive print. At present, the selection of the colour filter values, which are to be used for correcting the contrast range of an excessively hard or of an insufficiently hard negative upon exposing gradation change papers, is carried out by the operator, who will determine the colour filter value and the density in accordance with his judgement of the contrasts of the negative. Since it is, quite naturally, difficult to determine the gradation change, which will result in the desired positive print, by viewing a negative, the final adjustment of the colour filter combination and of the respective colour filter value, which will be required for the optimum gradation change, can in many cases only be effected after having previously made a test print with a first, still incorrect colour filter value which has roughly been estimated by the operator.

In the field of colour print production on the basis of colour originals, in particular colour negatives, the use of a so called video analyzer for determining the colour filter values by means of which a print is produced from a specific original has been common practice for some time. However, such a video analyzer cannot be used for determining the necessary colour filter value for the production of black-and-white prints with a gradation change paper.

SUMMARY OF THE INVENTION

Taking this prior art as a basis, the present invention is based on the task of providing an apparatus used for determining a colour filter value for the exposure of a gradation change paper and permitting a sufficiently precise determination of the necessary colour filter value, without there being any necessity of producing test prints for this purpose.

In accordance with the present invention, this task is solved by an apparatus having the features disclosed in the specification and drawings.

The apparatus according to the present invention is equipped with a recording device for recording the original, an inverting circuit disposed subsequent to said recording device and used for inverting the recording signal supplied by said recording device, a monitor disposed subsequent to said inverting circuit and operating in a black-and-white mode of operation, and an electronic contrast control device used for said monitor and calibrated such that each adjustment value of the electronic contrast control device has associated therewith a colour filter value which relates to a colour filter to be used upon exposing the gradation change paper and on the basis of which a contrast of the print corresponding to that of the image on the monitor will be achieved.

The recording device can be a scanner for scanning the original or a colour mixing head for exposing the original plus a video camera for recording the exposed original.

In accordance with a special aspect of the present invention, a colour filter, which is adapted to be slid or swung into the ray path, is positioned in the ray path of the recording device, said colour filter being adapted to be swung or slid into the ray path of the scanner or into the ray path between the colour mixing head and the video camera, and the contrast control device being adjusted and controlled, respectively, in response to the pivotal angle or the insertion path of said colour filter. In the case of this form of the implementation according to the present invention, the operator will—after having inserted the original into the apparatus according to the present invention—adjust the setting of the colour filter coupled with the contrast control device until the black-and-white image on the monitor shows the desired contrast. In the case of this adjustment of the colour filter, the future exposure of the gradation change paper will inevitably result in a print having the desired contrast range, which was previously visible on the monitor image.

In accordance with a further, substantial aspect of the present invention, the apparatus for determining the colour filter value according to the invention includes a first colour measuring device for determining the colour composition of the exposure light in the case of which the desired contrast on the monitor is achieved on the basis of the adjustment of the colour filter as well as on the basis of the corresponding, associated adjustment of the contrast control device. This filter value and, possibly, density value can be used for adjusting thereto the filtering of the exposure light of an enlarger or printer, which is equipped with a second colour measuring device, said adaptation of the colour temperature being effected by swinging a second colour filter into the ray path of the enlarger or printer in an adequate manner. When the measured values of the first and second colour measuring devices correspond to one another, it will be guaranteed that, independently of special properties of the light sources and colour mixing heads used in the enlargers or printers, contrasts of the prints corresponding to the contrasts and densities of the previously viewed monitor images will be achieved.

In the following, preferred embodiments of the present invention will be explained in detail with respect to the drawings enclosed, in which:

DETAILED DESCRIPTION OF THE INVENTION

Figure 1:
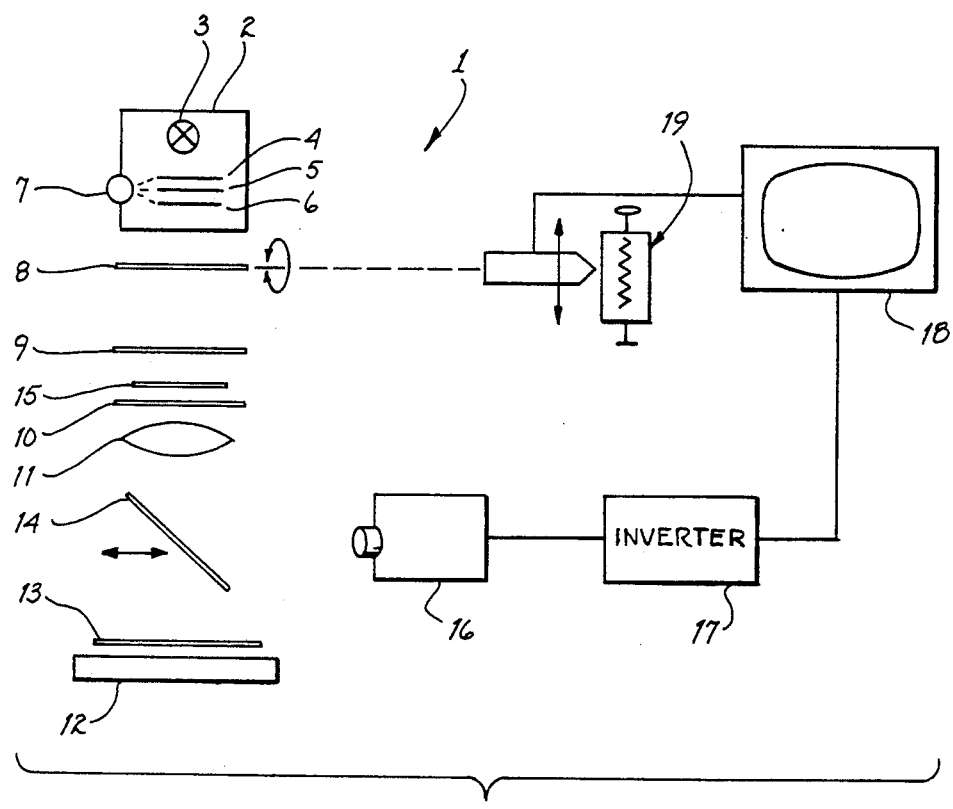
FIG. 1 shows a first embodiment of the apparatus for determining the colour filter value in accordance with the present invention.

The simplest embodiment of the apparatus according to the present invention, which is shown in FIG. and which is used for determining a colour filter value to be used for a specific original for the purpose of exposing a gradation change paper, is provided with refererence numeral 1 in its entirety. The apparatus includes a colour mixing head 2, which is provided with a light source 3 and a set of colour filters 4, 5, 6 having an adjustment device 7 associated therewith. A pivotable multigrade colour filter 8 is positioned in the ray path behind the colour mixing head 2, said multigrade colour filter 8 being arranged such that it is adapted to be rotated about an axis extending in the direction of the ray path. A scattering device or a sheet of milk glass 9 for rendering uniform the exposure light can be arranged in the ray path behind the multigrade colour filter 8. Said scattering device or sheet of milk glass is followed by an original supporting plate 10 adapted to have positioned thereon an original, which can be a black-and-white negative in the case of the present example.

In said ray path, the original supporting plate 10 is followed by an optical system 11 by means of which an image of the original can be formed on the supporting plane of a paper supporting means 12 for a gradation change paper 13 to be exposed.

A mirror 14 can be swung into the ray path between the optical system 11 and the paper supporting means 12, the original 15 being adapted to be scanned by a video camera 16 or some other suitable recording device via said mirror 14. The video camera 16 has its output side connected to an inverting circuit 17, which inverts the black-and-white video signal of the negative original 15 supplied by said video camera 16. The inverting circuit 17 has its output side connected to the video input of a monitor 18 operating in a black-and-white mode of operation.

The pivotal adjustment of the multigrade colour filter 8, which constitutes a measure of the colour temperature emitted by said multigrade colour filter 8, is detected by a potentiometer 19 whose movable tap 20 is in moving connection with said multigrade colour filter 8. In the case of a preferred, simple embodiment, the potentiometer 19 is positioned coaxially with the axis of the pivotable multigrade colour filter 8.

The output signal of the potentiometer 19 serves to control an electronic contrast control device of the monitor 18, such an electronic contrast control device being provided in most black-and-white monitors so that an explanation thereof can be dispensed with. By means of an appropriate type of potentiometer resistor, by means of a voltage divider connected to the tap and arranged subsequent thereto, or by other measures, which are, in principle, known and which are taken for adapting two curves to each other, the electronic contrast control device is calibrated such that each adjustment value of said electronic contrast control device has associated therewith a colour filter value which relates to a colour filter to be used upon exposing the gradation change paper and on the basis of which a contrast of the print corresponding to that of the image on the monitor will be achieved.

In practice, such a calibration can be carried out by first taking as a basis an arbitrary original and producing once (only for the calibration process) a plurality of test prints corresponding in number to several predetermined pivotal positions of the multigrade colour filter 8, whereupon such an adjustment of the potentiometer or some other type of calibration of the contrast control device of such a nature is effected that, at these predetermined pivotal positions of the multigrade colour filter 8, the contrast of the monitor image will correspond to that of the test print associated with the respective colour filter adjustment.

A thus calibrated apparatus can now be used for a simple working procedure, which is carried out such that, when the original 15 has been inserted and when the mirror 14 has been swung into the ray path, the pivotal angle of the multigrade colour filter 8 will be changed until the black-and-white image reproduced on the monitor 18 has the desired contrast range. Using this adjustment of the multigrade colour filter 8, the mirror 14 will be removed from the ray path and a gradation change paper 13 will be exposed.

Making reference to FIG. 2, a second embodiment will be explained hereinbelow, said second embodiment including a colour enlarger or colour printer arranged separately from the apparatus for determining a colour filter value, which is provided with reference numeral 1 in its entirety, said colour enlarger or colour printer being, in turn, provided with reference numeral 200.

The first-mentioned apparatus 1 largely corresponds to the apparatus, which has been explained with reference to FIG. 1, so that only deviations will be explained hereinbelow. Parts corresponding to those of the embodiment according to FIG. 1 are provided with the same reference numeral.

Figure 2:
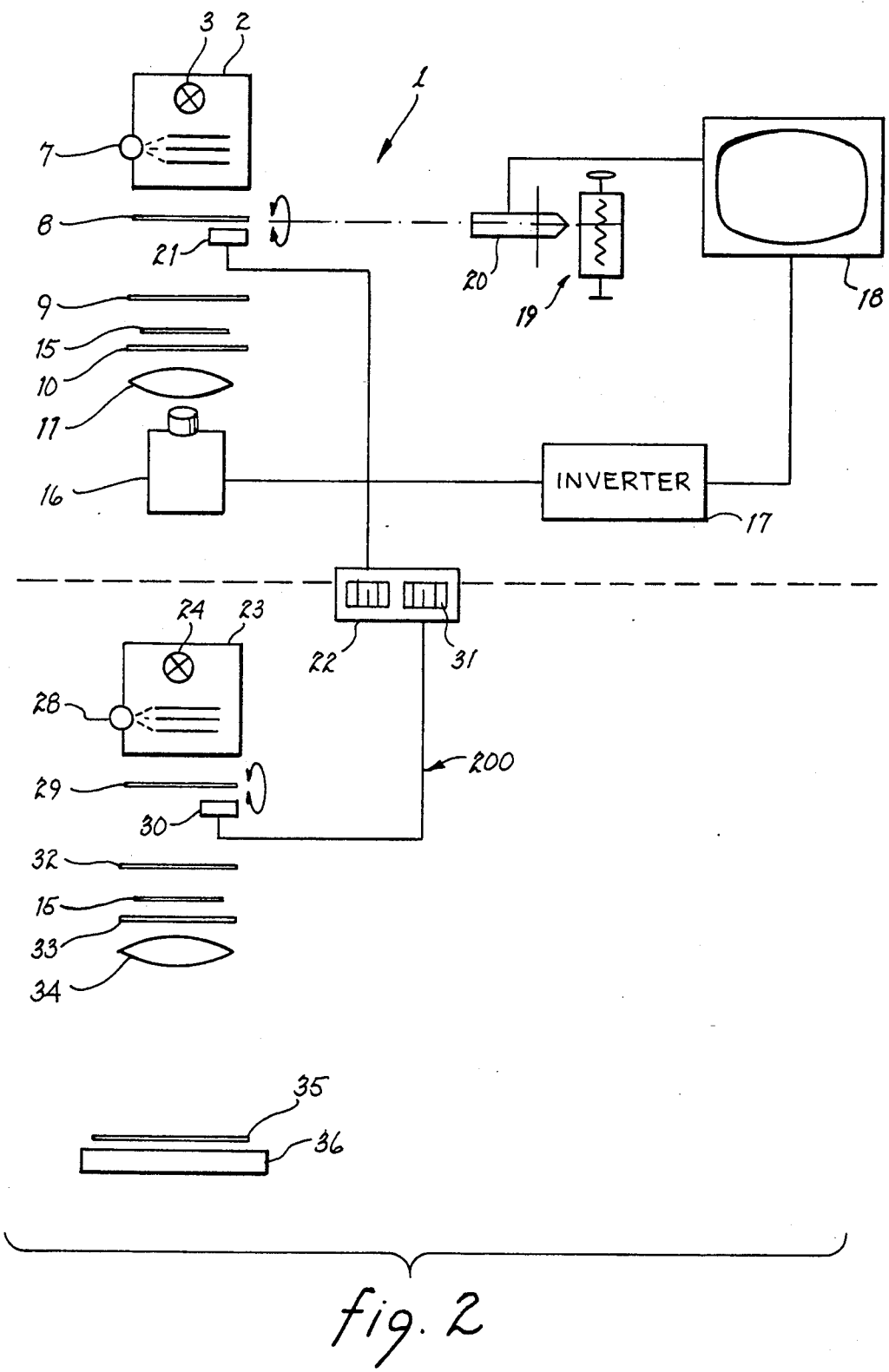
FIG. 2 shows a second embodiment of this apparatus.

Deviating from the embodiment according to FIG. 1, neither a mirror 14, nor a paper supporting means 12, nor a gradation change paper 13 is provided in the case of apparatus 1 according to FIG. 2, since, in the case of this embodiment, said apparatus 1 is only used for analyzing the original, but not for producing prints. A first colour measuring device 21 is positioned behind the first multigrade colour filter 8 in the ray path of the first colour mixing head 2 of said apparatus 1, said colour measuring device 21 being used for measuring the colour temperature of the light resulting from an adjustment of the multigrade colour filter 8 of such a nature that the image on the monitor 18 shows the desired contrast. The colour temperature thus measured by the first colour measuring device will be displayed e.g. on a first display means 22.

In a manner known per se, the colour printer 200 comprises a second colour mixing head 23, which is provided with a light source 24 and with a second set of colour filters 25, 26, 27 having a second adjustment device 28 associated therewith. A second multigrade colour filter 29, which is also adapted to be rotated about an axis extending in the direction of the ray path, is positioned in said ray path behind the second colour mixing head. The colour temperature of the exposure light emitted by said second multigrade colour filter 29 is detected by a second colour measuring device 30 having its output side connected to a second display means 31. A second scattering device 32, which can e.g. consist of a sheet of milk glass, is positioned in the ray path behind the second multigrade colour filter 29. A second original supporting plate 33 is positioned below said second scattering device 32, the original 15 being adapted to be placed on said original supporting plate 33 after having been subjected to a contrast analysis in said apparatus By means of a second optical system 34, the original is imaged on a gradation change paper 35, which is placed on a second paper supporting means 36.

By adequately adjusting the second multigrade colour filter 29, the value displayed on the second display means 31 is brought into correspondence with the previous value displayed on the first display means 22. It is thus guaranteed that, independently of the properties of the respective colour mixing head 23 used, the exposure light for exposing the gradation change paper 35 will have the same colour temperature as that which has been used for analyzing the original 15 in said analyzer 1. This will have the effect that, when the print is being produced by means of the colour enlarger 200, the contrasts, which the operator determined on the monitor 18 as being desirable, will inevitably be obtained, independently of the respective properties of the colour mixing head of said colour enlarger.

The colour enlarger 200 described is equipped with a second multigrade colour filter 29. However, the colour enlarger can also be constructed such that it does not include such a multigrade colour filter, since it is possible to adjust the desired colour composition of the exposure light by adjusting its colour filters 25, 26, 27 alone.

It is also possible to provide, instead of a colour mixing head, a simple light source and a multigrade colour filter following said light source.

In the case of the embodiments according to FIG. 1 and 2, the multigrade clour filters are filters which are pivotable, i.e. rotatable about an axis. However, it is just as well possible to use linearly displaceable filters instead of pivotable filters.

In the case of the embodiments described, a potentiometer serves to adjust the contrast control device of the monitor 18. To the person skilled in the art, it will be obvious that, instead of using said potentiometer, it will be possible to use any type of detection of the position of the multigrade colour filter 8. The position of the multigrade colour filter can, for example, also be detected indirectly by determining the colour temperature of the light emitted thereby. Moreover, opto-electronic position detection means for detecting the angular position or the translational position of the colour filter can be provided instead of the mechanically sensing potentiometer.

What is claimed is:

1. An apparatus for determining a colour filter value which is to be used for a specific original for exposing a gradation change paper, characterized by
    a recording device (16) used for recording the original (15),
    an inverting circuit (17) used for inverting the recording signal supplied by the recording device (16),
    a monitor (18) following said inverting circuit (17) and operating in a black-and-white mode of operation, and
    an electronic contrast control device used for said monitor (18) and calibrated such that each adjustment value of the electronic contrast control device has associated therewith a colour filter value which relates to a colour filter (8, 29) to be used upon exposing the gradation change paper (13, 35) and on the basis of which a contrast of the print corresponding to that of the image on the monitor will be achieved.

2. An apparatus according to claim 1, characterized in
    that the recording device comprises a scanner for scanning the original (15).

3. An apparatus according to claim 1, characterized in
    that the recording device comprises a colour mixing head or a light source (2) for exposing the original (15) as well as a video camera (16) for recording said original (15).

4. An apparatus according to claim 2, characterized in
    that the recording device comprises a displaceable or a pivotable first adjustment colour filter (8), which is in the ray path of the scanner, and
    that the contrast control device is adapted to be controlled in accordance with the pivotal angle or the insertion path of said first adjustment colour filter (8).

5. An apparatus according to claim 3, characterized in
    that the recording device comprises a displaceable or a pivotable first adjustment colour filter (8), which is in the ray path extending from the colour mixing head or from the light source (2) to the video camera (16), and
    that the contrast control device is adapted to be controlled in accordance with the pivotal angle or the insertion path of said first adjustment colour filter (8).

6. An apparatus according to claim 4 characterized by
    a first colour measuring device (21) arranged behind the first adjustment colour filter (8) in the ray path of said apparatus (1) and used for determining the colour temperature of the exposure light in the case of which the desired contrast on the monitor (18) will be achieved on the basis of the setting of the adjustment colour filter as well as on the basis of the corresponding adjustment of the contrast control device.

7. An apparatus according to claim 5 characterized by
    a first colour measuring device (21) arranged behind the first adjustment colour filter (8) in the ray path of said apparatus (1) and used for determining the colour temperature of the exposure light in the case of which the desired contrast on the monitor (18) will be achieved on the basis of the setting of the adjustment colour filter as well as on the basis of the corresponding adjustment of the contrast control device.

8. An apparatus according to claim 6 characterized by
    a second colour measuring device (30), which is arranged in the ray path of an enlarger (20) or printer behind the second multigrade colour filter (29) thereof and the measured colour value of which can be brought into correspondence with the measured colour value and/or density value of the first colour measuring device (21) by sliding or swinging the second adjustment filter (29) into the ray path of the enlarger or printer.

9. An apparatus according to claim 7, characterized by
    a display device (22, 31) which is adapted to display thereon the colour composition and/or density composition measured by said first colour measuring device (21) as well as the colour temperature value measured by said second colour measuring device (30).

10. A method for determining a colour filter value which is to be used for a specific original for exposing a gradation change paper, characterized by providing a recording device (16) used for recording the original (15), providing an inverting circuit (17) used for inverting the recording signal supplied by the recording device (16), providing a monitor (18) following said inverting circuit (17) and operating in a black-and-white mode of operation, and providing an electronic contrast control device used for said monitor (18) and calibrated such that each adjustment value of the electronic contrast control device has associated therewith a colour filter value which relates to a colour filter (8, 29) to be used upon exposing the gradation change paper (13, 35) and on the basis of which a contrast of the print corresponding to that of the image on the monitor will be achieved.

* * * * *